(12) United States Patent
Sestok, IV et al.

(10) Patent No.: US 7,031,379 B2
(45) Date of Patent: Apr. 18, 2006

(54) TIME DOMAIN EQUALIZER FOR DMT MODULATION

(75) Inventors: Charles K. Sestok, IV, Cambridge, MA (US); Nirmal C. Warke, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 756 days.

(21) Appl. No.: 09/939,134

(22) Filed: Aug. 24, 2001

(65) Prior Publication Data

US 2003/0043894 A1    Mar. 6, 2003

(51) Int. Cl.
*H04B 1/38* (2006.01)
*H04L 5/16* (2006.01)

(52) U.S. Cl. .............................. 375/219; 455/73; 710/1
(58) Field of Classification Search ................ 375/219, 375/350, 229
See application file for complete search history.

(56) References Cited

U.S. PATENT DOCUMENTS

| | | | |
|---|---|---|---|
| 5,285,474 A | 2/1994 | Chow et al. | 375/13 |
| 6,219,378 B1 | 4/2001 | Wu | 375/231 |
| 6,226,322 B1 * | 5/2001 | Mukherjee | 375/229 |
| 6,396,886 B1 * | 5/2002 | Kapoor | 375/350 |
| 6,408,022 B1 * | 6/2002 | Fertner | 375/230 |

OTHER PUBLICATIONS

Van Kerckhove et al., "Adapted Optimization Criterion for FDM-based DMT-ADSL Equalization", ICC 1996, pp. 1328-1334.

Arslan, et al., "Optimum Channel Shortening for Discrete Multitone Transceivers", *Proc. IEEE Int. Conf. on Acoustics, Speech, and Signal Processing*, vol. 5 (Jun., 2000), pp. 2965-2968.

Farhang-Boroujeny et al., "Design Methods for Time Domain Equalizers in DMT Transceivers", *Trans. Comm.*, vol. 49, No. 3 (IEEE, 2001), pp. 554-562.

Cioffi, *A Multicarrier Primer*, T1E1.4/91-157, (Amati Comm. Corp. and Stanford University, Nov. 1991).

Bingham, "Multicarrier Modulation for Data Transmission: An Idea Whose Time Has Come", *IEEE Communications Magazine* (May, 1990), pp. 5-14.

(Continued)

*Primary Examiner*—Stephen Chin
*Assistant Examiner*—Erin M. File
(74) *Attorney, Agent, or Firm*—Abdul Zindani; W. James Brady, III; Frederick J. Telecky, Jr.

(57) ABSTRACT

A method for deriving coefficients for a time domain equalizer function (24) as implemented by a digital signal processor (35) in a DSL modem (20) is disclosed. A transmitting modem (10), such as at a central office, issues a pseudorandom training sequence that is received by the receiving modem (20). Correlation matrices are derived by the digital signal processor (35), from which sets of eigenvalues and eigenvectors are derived. A flatness constraint on the frequency response of the time domain equalizer is established, and included with a flatness scaling factor (λ) into a minimization cost function. One or more values of the flatness scaling factor (λ), preferably between minimum and maximum eigenvalues, are evaluated in the cost function, to derive the optimum filter for the time-domain equalizer. The flatness constraint ensures that the time-domain equalizer is not subject to near null conditions and large variations in its frequency response.

10 Claims, 3 Drawing Sheets

OTHER PUBLICATIONS

Chow et al., "A Discrete Multitone Transceiver System for HDSL Applications", *IEEE Journal on Selected Areas in Communications*, vol. 9, No. 6 (Aug. 1991), pp. 895-908.

Al-Dhahir et al., "Optimum Finite-Length Equalization for Multicarrier Transceivers", *Trans. on Comm.*, vol. 44, No. 1 (IEEE, 1996), pp. 56-64.

* cited by examiner

TIME DOMAIN EQUALIZER FOR DMT MODULATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data communications, and is more specifically directed to modulator/demodulators (modems) for use in such communications.

As is well-known in the art, many modern data communications utilize multicarrier modulation (MCM) to provide high data rates. According to this technology, multiple carrier-modulated data streams are transformed into a single waveform for transmission; the inverse transformation at the receiver separate the multiple carriers, and recover the modulating symbols. MCM techniques are used in such communications applications as such as Digital Subscriber Line (DSL) services, fixed wireless, digital audio broadcast (DAB), and terrestrial digital video broadcast (DVB-T). MCM fundamentals are described in Bingham, "Multicarrier Modulation for Data Transmission: An Idea Whose Time Has Come", *IEEE Communications Magazine* (May, 1990), pp. 5–14, and Cioffi, *A Multicarrier Primer*, T1E1.4/91–157, (Amati Comm. Corp. and Stanford University, November 1991).

One important and now popular modulation standard for DSL communication is Discrete Multitone (DMT). According to DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane; the number of available symbol values depends, of course, on the number of bits in each symbol. During initialization of a DMT communications session, the number of bits per symbol for each subchannel (i.e., the "bit loading") is determined according to the noise currently present in the transmission channel at each subchannel frequency and according to the transmit signal attenuation at that frequency. For example, relatively noise-free subchannels may communicate data in ten-bit to fifteen-bit symbols corresponding to a relatively dense QAM constellation (with short distances between points in the constellation), while noisy channels may be limited to only two or three bits per symbol (to allow a greater distance between adjacent points in the QAM constellation). In this way, DMT maximizes the data rate for each subchannel for a given noise condition, permitting high speed access to be carried out even over relatively noisy twisted-pair lines.

DMT modulation also permits much of the processing of the data to be carried out in the digital domain. Typically, the incoming bitstream is serially received and then arranged into symbols, one for each subchannel (depending on the bit loading). Reed-Solomon coding and other coding techniques are also typically applied for error detection and correction. Modulation of the subchannel carriers is obtained by application of an inverse Discrete Fourier Transform (IDFT) to the encoded symbols, producing the output modulated time domain signal. This modulated signal is then serially transmitted. All of these operations in DMT modulation can be carried out in the digital domain, permitting implementation of much of a DSL modem, and particularly much of the processing-intensive operations, in a single chip (such as a Digital Signal Processor, or DSP).

The discrete output time domain signal from the modulation is then converted into a time-domain analog signal by a conventional digital-to-analog converter. The analog signal is then communicated over the transmission channel to the receiving modem, which reverses the process to recover the transmitted data. The non-ideal impulse response of the transmission channel of course distorts the transmitted signal. Accordingly, the signal received by the receiving modem will be a convolution of the analog output waveform with the impulse response of the transmission channel. Ideally, the DMT subchannels in the received signal are orthogonal so that the modulating data can be retrieved from the transmitted signal by a Discrete Fourier Transform (DFT) demodulation, under the assumption that convolution in the time domain corresponds to multiplication in the frequency domain.

One may express the time-domain signal y(t) at the receiver, based on a transmitted time-domain signal x(t), as:

$$y(t) = x(t) \otimes h(t)$$

This expression simply states that the received signal y(t) is the time-domain convolution of the input signal x(t) with the channel impulse response h(t). In the ideal case, this time-domain expression can be expressed in the frequency-domain as:

$$Y(\omega) = X(\omega) \cdot H(\omega)$$

where X(ω), H(ω), and Y(ω) are the respective frequency-domain representations of time-domain signals x(t), h(t), y(t). Considering that the transmitted signal x(t) is the IDFT of the symbol sequences at their respective subchannel frequencies, the frequency-domain spectrum X(ω) corresponds to the symbols themselves. According to the DMT modulation technology, the receiver can therefore retrieve the symbols X(ω) by removing the channel response H(ω) from the DFT of the frequency-domain received signal Y(ω); this can typically be performed by a single-tap frequency domain equalizer.

However, time domain convolution corresponds to frequency domain multiplication only if the input sequence is infinitely long, or if the input sequence is periodic. Because the number of subchannels is finite, however, the number of real-valued time-domain samples at the output of the transmitter IDFT (i.e., the "block" length) is also finite. Accordingly, it is useful to make the transmitted signal appear to be periodic, at a period on the order of the block length. A well-known technique is the use of a cyclic prefix in the transmitted data stream. The cyclic prefix is generally defined as a number ν of samples at the end of a block of samples in the output bitstream. These ν samples are prepended to the block, prior to digital-to-analog conversion. This effective periodicity in the input sequence thus permits the use of a DFT to recover the modulating symbols in each subchannel, under the assumption that the cyclic prefix length is less than the channel length.

In effect, the use of the cyclic prefix eliminates inter-symbol interference (ISI) between adjacent data frames, and inter-carrier interference (ICI) between subchannels. ISI generally arises from distortion and spreading of the transmitted signal over the channel, which causes the end of one DMT symbol to overlap into the beginning of the next DMT symbol. ICI affects the independence of the subcarriers, resulting in loss of orthogonality among the subchannels. Of course, if the subchannels are no longer orthogonal to one another, the modulating data on these subchannels cannot be separated at the receiver.

However, in order for the input sequence to truly appear periodic, and for the ISI interference to be contained within the redundant prefix of the block, the cyclic prefix must be longer than the length of the channel response. To ensure that ISI is not present in the transmitted signal, therefore, one may of course use a long cyclic prefix. Because the cyclic prefix does not itself contain any information or "payload" (considering that the prefix is redundant with the samples at the end of the block), a cyclic prefix of any length reduces the efficiency of the transmission. Accordingly, some transmission channels may have impulse responses that are so long as to prevent DMT data transmission at a reasonable efficiency.

In many DSL subscriber loops, the transmission channel response may indeed be very long, requiring an extremely long cyclic prefix, and resulting in a significant loss of data rate. By way of further background, time domain equalizers are known in the art as useful in effectively reducing the length of the channel response, for example as described in Chow et al., "A Discrete Multitone Transceiver System for HDSL Applications", *IEEE Journal on Selected Areas in Communications*, Vol. 9, No. 6 (August 1991), pp. 895–908. A time domain equalizer is typically a small finite impulse response digital filter at the receiver that is applied to the received signal after conversion from analog to digital, but prior to removal of the cyclic prefix and prior to the DFT into the frequency domain (hence the name time domain equalizer). The time domain equalizer is intended to reduce the effective length of the channel response to less than the length of the cyclic prefix.

FIG. 1 illustrates an algorithm for defining the response of a time domain equalizer according to the conventional minimum mean squared error (MMSE) technique. In the MMSE algorithm, an input signal x(t) is applied to channel response h(t) model 2, which may be derived from an estimate of the channel response. The application of the input signal x(t) to channel response model 2 is then added to a noise estimate n(t), via adder 3, to produce received output signal y(t), which is applied to time domain equalizer 4. Time domain equalizer 4 may be implemented as an adaptive digital filter, as will be described below. The output of time domain equalizer 4 is applied to one input of adder 5. The input signal x(t) is also applied, through delay stage 6 (which compensates for the delay through the other leg), to desired impulse response model 8. The desired impulse response of model 8 is selected to be of a length that is less than the length of the cyclic prefix to be used. The output of desired impulse response model 8 is applied to a negative input of adder 5, which generates an error signal e(t) at its output that is applied to time domain equalizer 4.

In defining the coefficients to be used in a digital filter representation of time domain equalizer 4, time domain equalizer 4 is iteratively adjusted in response to the error signal e(t), in a direction to minimize error signal e(t). Upon convergence, the output of time domain equalizer 4 corresponds to the input signal x(t) convolved with the desired impulse response of model 8, from which the input signal x(t) can be readily recovered. The coefficients of the digital filter used to realize time domain equalizer 4 at this converged state can then be applied as a time domain equalizer in a receiving modem, with the equalizer then serving to reduce the effective length of the transmission channel response to the desired length, preferably within the length of the cyclic prefix. The combination of the channel response h(t) and the time domain equalizer filter is often referred to as the target impulse response, or TIR.

The convergence algorithm can be solved by a convenient matrix formulation. A vector $\underline{w}=[w_0 w_1 \ldots w_l]^T$ can be defined as the l+1 sample TEQ impulse response, and a vector $\underline{b}=[b_0 b_1 \ldots b_k]^T$ can be defined as the k+1 sample target channel. Where $\underline{y}=[y_0 y_1 \ldots y_{-1}]^T$ is the last l+1 samples of the channel output, and $\underline{x}_\Delta=[x_{-\Delta} x_{-\Delta-1} \ldots x_{-\Delta-k}]^T$ is defined as a delayed input sequence, the error e[n] for n=0 can be derived as:

$$e[0] = \underline{w}^T \underline{y} - \underline{b}^T \underline{x}_\Delta$$

which corresponds to the difference between the outputs of the two channels form TEQ 4 and target channel response 8 of FIG. 1, as produced by adder 5. The mean-squared error $E[e^2[0]]$ can thus be given by:

$$E[e^2[0]] = \underline{w}^T R_{yy} \underline{w} + \underline{b}^T R_{xx} \underline{b} - 2\underline{w}^T R_{yx} \underline{w}$$

where $R_{xx}$ and $R_{yy}$ are the autocorrelation matrices for $\underline{x}_\Delta$ and $\underline{y}$, respectively, and where $R_{yx}$ is their cross-correlation matrix.

In practice, minimization of the mean-squared error $E[e^2[n]]$ computes the values of filter matrices $\underline{w}$ and $\underline{b}$, and time delay $\Delta$, that minimizes the function. In order to avoid the trivial solution of zero-valued matrices $\underline{w}$ and $\underline{b}$, either a unit tap constraint (UTC) on matrix $\underline{b}$ ($b_k=1$) or a unit norm constraint (UNC) on matrix $\underline{w}$ ($\|w\|=1$) is applied. Standard Lagrange multiplier techniques derive a solution in either case, depending upon the matrix $R_{MSE}=R_{yy}-R_{yx}R_{xx}^{-1}R_{xy}$. For the UNC case, the time domain equalizer vector $\underline{w}$ becomes the eigenvector of $R_{MSE}$ that is associated with the minimum magnitude eigenvalue. In the UTC case, the time domain equalizer is:

$$\omega_{UTC} = \frac{R_{MSE}^{-1} \delta_k}{\delta_k^T R_{MSE} \delta_k}$$

where $\delta_k=1$ for sample k, and zero elsewhere.

Variations on the MMSE implementation of a time domain equalizer are known in the art. Van Kerckhove et al., "Adapted Optimization Criteria for FDM-based DMT-ADSL Equalization", ICC 1996, pp. 1328–34 describes an approach in which the MMSE minimization of the time domain equalizer is tuned for an FDM-based ADSL modem and is performed with the injection of virtual noise; the noise signal is virtual in that it is mathematically generated rather than based on noise measurements.

In most asymmetric DSL (ADSL) applications, as is well known, upstream (subscriber to central office) communications are in a low frequency band while downstream (central office to subscriber) communications are in a high frequency band, where the two frequency bands do not overlap one another; this approach is referred to as frequency division multiplexing (FDM). Typically, therefore, analog filtering is performed at the receiver to cancel echoes of its upstream signal from interfering with the received downstream signal. This analog filtering is a significant contributor to the overall target impulse response (TIR), especially if the high-pass downstream filter is required to have a sharp rolloff characteristic.

Conventional optimization of a time domain equalizer in an ADSL modem therefore involves difficult tradeoffs. In theory, a time domain equalizer can be derived that compensates both for a long channel response and also a sharp high-pass filter characteristic, however such a conventional time domain equalizer will necessarily be quite complex. In addition, the resulting TEQ will add significant energy into the low-frequency band due to the high-pass filtering, which will necessarily amplify noise in this band and cause it to spread into the low-frequency symbols, reducing the signal-to-noise ratio and also impacting resolution of the TEQ coefficients for high frequency components.

By way of further background, it has been observed that the frequency domain behavior of conventional MMSE TEQs when applied to FDM modems is quite poor. Near nulls often result in the passband region, while the downstream DFT demodulation process causes appreciable spectral leakage of noise power between adjacent frequency bins, including into the near null frequencies. These near nulls therefore result in a loss of channel capacity. To address this issue, alternative MMSE design of the time domain equalizer is based on the maximizing of an approximation to the system channel capacity. According to this approach, the time domain equalizer is designed by maximizing a product of the power spectra of the target channel over the DFT bins in the passband regions of the received signal, as described in Al-Dhahir et al., "Optimum Finite Length Equalization for Multicarrier Transceivers", *IEEE Trans. Comm.*, Vol. 44, No. 1 (January 1996), pp. 56–64. In effect, this maximization eliminates near nulls in the spectrum of the TEQ within the pass band. Because the design of time domain equalizers using this criterion requires a computationally complex non-linear constrained optimization procedure, approximations to this approach have been developed. According to Farhang-Boroujeny et al., "An Eigen-Approach to the Design of Near-Optimum Time Domain Equalizers for DMT Transceivers", ICC 1999, an ad hoc approximation to the capacity maximization problem is to define the time domain equalizer from a linear combination of the eigenvectors of the correlation matrix of the TEQ input that provides a TIR with no null in its spectrum and provides a relatively low MSE.

BRIEF SUMMARY OF THE INVENTION

It is therefore an object of the present invention to provide a time domain equalizer that optimally shortens the effective transmission channel response to maximize channel capacity.

It is a further object of this invention to provide such a time domain equalizer that is suitable for use in ADSL transceiver applications, in which sharp high-pass filters are utilized.

It is a further object of this invention to provide a method for designing such a time domain equalizer.

It is a further object of the invention to provide a transceiver, such as a modem, including such a time domain equalizer.

Other objects and advantages of the present invention will be apparent to those of ordinary skill in the art having reference to the following specification together with its drawings.

The present invention may be implemented into a receiver, such as used in a DSL transceiver operating according to discrete multitone modulation. In this invention, a time domain equalizer is provided for effectively reducing the length of the transmission channel response to below a limit corresponding to the length of a cyclic prefix included with each block of transmitted time-domain data. The time domain equalizer is designed according to a constrained mean-squared-error minimization of the channel response and time domain equalizer, where the constraint is a frequency domain flatness constraint of arbitrary phase.

DETAILED DESCRIPTION OF THE INVENTION

The present invention will be described in connection with an example of its implementation in a transceiver, such as a Digital Subscriber Line (DSL) modem. It will be apparent to those skilled in the art having reference to this specification that this invention is particularly well-suited for use in such an application. However, it is also contemplated that this invention will be of similar benefit in many other applications that involve the use of a time domain equalizer, particularly in its application of shortening the impulse response of a transmission channel. It is therefore to be understood that these and other alternatives to the embodiment described below are contemplated to be within the scope of the invention as claimed.

Figure 2:
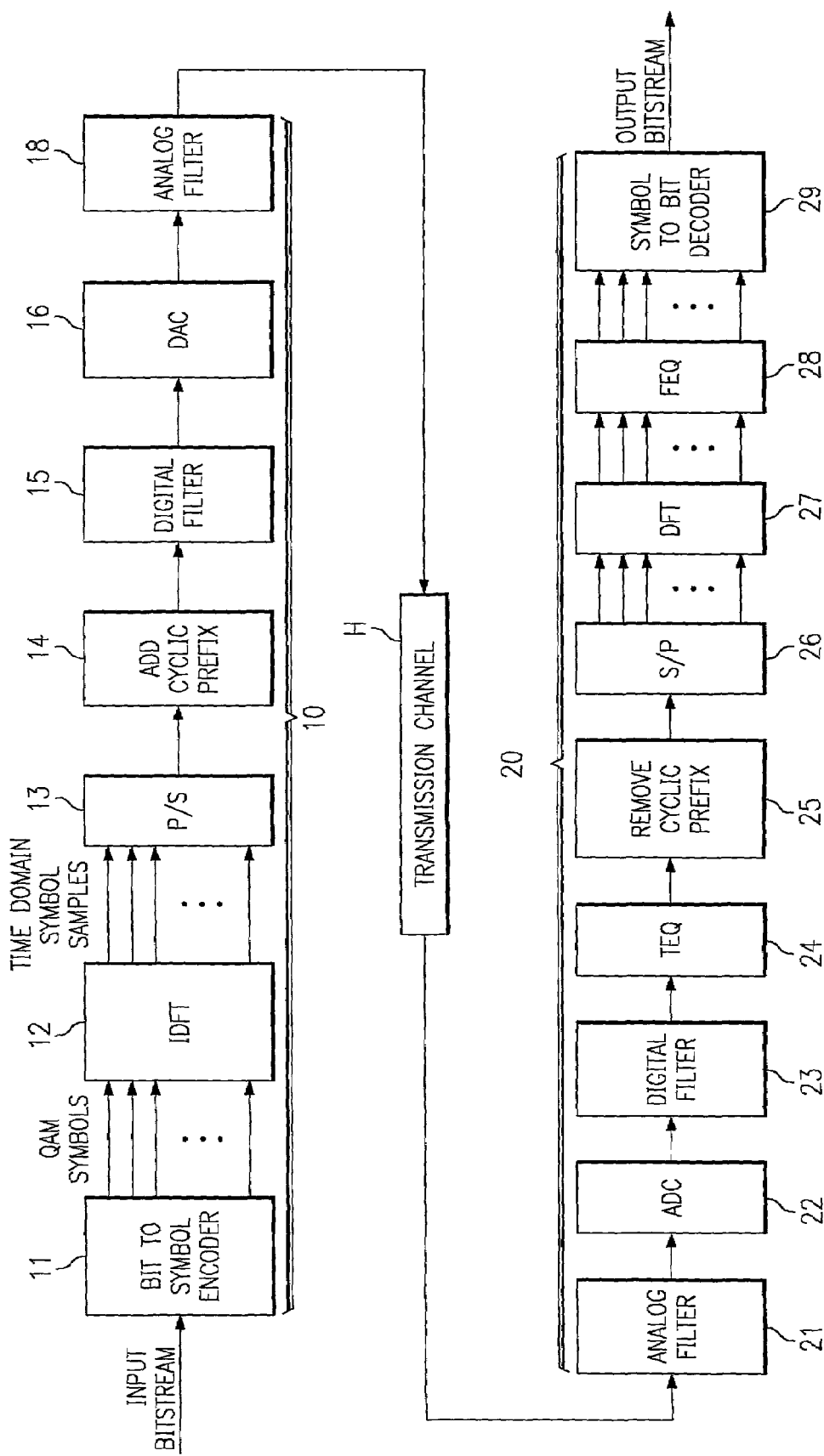
FIG. 2 is a functional block diagram of communications between two DMT transceivers, where at least the receiving transceiver is constructed according to the preferred embodiment of the invention.

FIG. 2 functionally illustrates an example of a DSL communication system into which the preferred embodiment of the invention is implemented. In the system of FIG. 2, only one direction of transmission (from transmitting modem 10 to receiving modem 20) is illustrated; it will of course be understood by those skilled in the art that data will also be communicated in the opposite direction (from modem 20 to modem 10). According to this embodiment of the invention, the DSL communications carried out in the system of FIG. 2 are of the asymmetric DSL (ADSL) type, with communications in the opposing directions will be carried out in non-overlapping frequency bands according to frequency division multiplexing (FDM). In this arrangement, so-called "downstream" communication from the telephone company central office to the subscriber's modem is in a higher frequency band (e.g., above 138 kHz) while "upstream" communication from the subscriber to the central office is at a lower frequency band. For purposes of the present invention, FIG. 2 can be considered to illustrate the functions carried out in downstream communication, in which case transmitting modem 10 is at the central office and receiving modem 20 is the subscriber, or client, modem.

As shown in FIG. 2, transmitting modem 10 receives an input bitstream that is to be transmitted to receiving modem 20. The input bitstream may be generated by a computer at the same location (e.g., the central office) as transmitting modem 10, or alternatively and more likely is generated by a computer network, in the Internet sense, coupled to the central office and transmitting modem 10. The input bitstream is a serial stream of binary digits, in the appropriate format as produced by the data source.

The input bitstream is received by bit to symbol encoder 11 in transmitting modem 10. Encoder 11 performs multiple functions in this embodiment. One such function is to group the bits in the input bitstream into multiple-bit symbols, for example ranging up to as many as fifteen bits. The symbols will be the values used to modulate the various subchannels, as will be described below. The symbols typically are not necessarily representative of the transmitted data itself, but instead simply correspond to grouping of the serial bitstream for broadband transmission. The number of bits in each symbol produced by encoder 11 will vary, in the DSL application, according to the bit loading assigned to each subchannel in the initialization of the communication session, as known in the art. In addition, encoder 11 may also use error correction coding, such as Reed-Solomon coding, for error detection and correction purposes; other types of coding, such as trellis or Viterbi coding, may also be applied for additional signal-to-noise ratio improvement. In addition, the symbols generated by encoder 11 are typically complex symbols, including both amplitude and phase information, and correspond to points in the appropriate modulation constellation (e.g., quadrature amplitude modulation, or QAM).

The encoded symbols are then applied to inverse Discrete Fourier Transform (IDFT), or inverse Fast Fourier Transform (IFFT), function 12. IFFT function 12 associates each input symbol with one subchannel in the transmission frequency band, and generates a corresponding number of time domain symbol samples according to the Fourier transform. These time domain symbol samples are then converted into a serial stream of samples by parallel-to-serial converter 13. Functions 11 through 13 thus convert the input digital bitstream into a serial sequence of symbol values representative of the sum of a number of modulated subchannel carrier frequencies, the modulation indicative of the various data values. Typically, if N complex symbols are presented to IFFT function 12, IFFT function 12 outputs a block of 2N real-valued time domain samples.

In function 14, a cyclic prefix is then added to each block of samples presented by IFFT function 12 through parallel-to-serial converter 13. The cyclic prefix is constructed by a selected number of sample values at the end of the block, and these values are then prepended to the block by function 14. For example, if each block includes 512 samples, a typical cyclic prefix is on the order of thirty-two samples. As described above in the Background of the Invention, the cyclic prefix has the effect of limiting intersymbol interference (ISI) due to energy from a previous symbol spreading into the next symbol due to the channel response; in other words, the cyclic prefix causes the datastream to appear to be periodic, so that the equivalence between frequency domain multiplication and time-domain convolution is valid. Those skilled in the art having reference to this specification will readily recognize that each of functions 11 through 14 may be carried out, and preferably are carried out, as digital operations. As such, it is contemplated that a high-performance digital integrated circuit, such as a digital signal processor (DSP) having computational power similar to or greater than the TMS320c5x and TMS320c6x DSPs available from Texas Instruments Incorporated will be suitable for these functions.

Digital filtering is then applied to the datastream with cyclic prefix, in function 15. This digital filtering function 15, in combination with analog filtering, incorporates the filtering required to accommodate the large dynamic range and wide frequency bands involved in DSL transmission, as described in U.S. Pat. No. 6,226,322, which is commonly assigned with this application and incorporated herein by reference. Typical digital filtering operations involved in function 15 may include interpolation filtering to increase the sample rate, a digital low pass filter for removing image components, and digital high pass filtering to eliminate POTS-band interference. The digitally-filtered datastream signal is then converted into the analog domain, by digital-to-analog converter 16. Analog filtering function 18 is then applied to the output analog signal, prior to its transmission. The filtering performed by function 18 typically includes at least a low-pass filter. As described in U.S. Pat. No. 6,226,322, digital filter function 15, digital-to-analog converter 16, and analog filter function 18 may be implemented in coder/decoder (codec) integrated circuit in transmitting central office modem 10.

Figure 1:
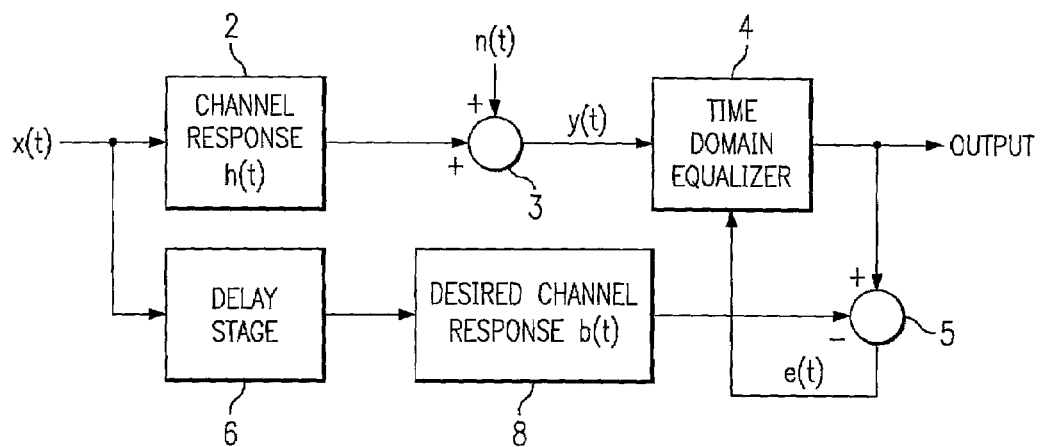
FIG. 1 is a diagram of a conventional (MMSE) time domain equalizer algorithm.

The output of analog filter 18 is then applied, via the appropriate line driver and other circuitry (not shown in FIG. 1) to transmission channel H, for forwarding to receiving modem 20. According to conventional ADSL technology, the transmission channel consists of some length of conventional twisted-pair wires. The transmission channel H communicates the transmitted analog signal, but adds distortion according to its impulse response h(t) as described above.

Figure 3:
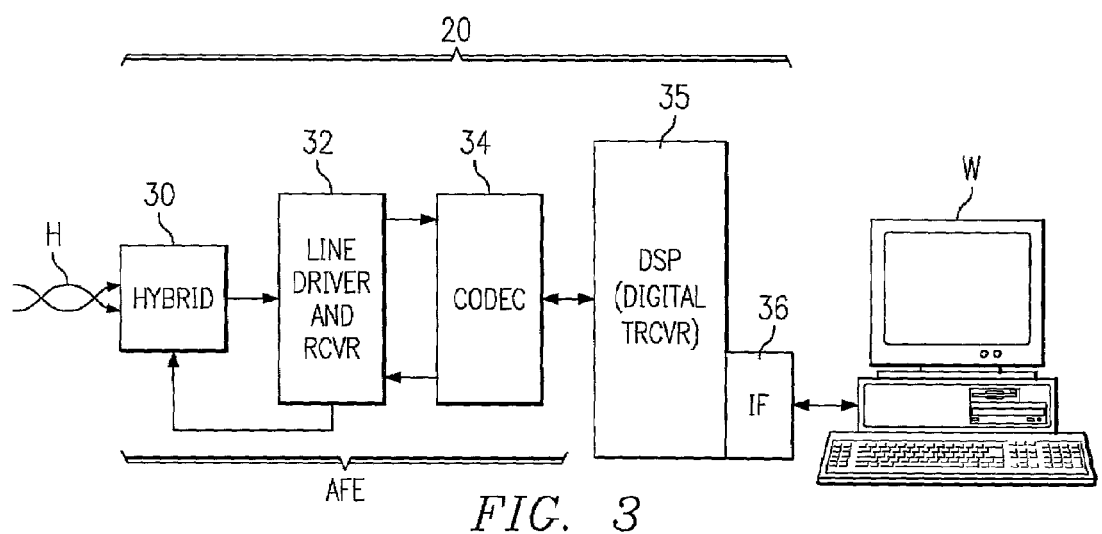
FIG. 3 is an electrical diagram, in block form, of a transceiver constructed according to the preferred embodiment of the invention.

The downstream transmitted signal is then received by receiving modem 20, which, in general, reverses the processes of transmitting modem 10 to recover the input bitstream as the output bitstream. Referring now to FIG. 3, the construction of receiving modem 20, as a transceiver (i.e., for both transmitting and receiving), will first be described.

As shown in FIG. 3, modem 20 includes hybrid circuit 30, which is connected to transmission channel H in the form of a twisted-pair facility. Hybrid circuit 30 is a conventional circuit that converts the two-wire arrangement of the twisted-pair facility to dedicated transmit and receive lines connected to line driver and receiver 32, considering that modem 20 is suitable for carrying out both the receipt of downstream communications from the central office and also the transmission of upstream communications to the central office. Line driver and receiver 32 is a high-speed line driver and receiver for driving and receiving ADSL signals over twisted-pair lines; an example of a suitable line driver and receiver circuit is the THS7102 line driver/receiver available from Texas Instruments Incorporated. Line driver and receiver 32 is bidirectionally coupled to coder/decoder (codec) circuit 34, which carries out analog filtering, analog-to-digital conversion, and some amount of digital filtering, as will be described below. According to the preferred embodiment of the invention, in which the ADSL communications are carried out according to a frequency division multiplexing (FDM) scheme, the upstream and downstream communications are in separate, non-overlapping, frequency bands, in which case codec circuit 34 high-pass filters the incoming downstream signal to eliminate any interference from the upstream signal being transmitted by modem 20. An example of a suitable codec device may be selected from the TLV320AD1x device family available from Texas Instruments Incorporated. Hybrid circuit 30, line driver and receiver 32, and codec 34 are often referred to, in the aggregate, as an "analog front end".

Modem 20 also includes DSP 35, which serves as a digital transceiver for DSL communications. As noted above, DSP 35 is a high performance digital signal processor, for carrying out the digital operations of the present invention as will be described below; exemplary devices suitable for use as DSP 35 include the TMS320c6x family of DSPs available from Texas Instruments Incorporated. A conventional interface 36 couples DSP 35 to the client workstation W, in the usual manner.

Referring back to FIG. 2, the functions of modem 20 in processing received downstream communications according to the preferred embodiment of the invention will now be described. Following physical receipt of the signal through hybrid circuit 30 and line driver and receiver 32 (FIG. 3), analog filtering function 21 is performed by codec 34, primarily to remove high frequency noise and aliasing from the incoming signal; as described in U.S. Pat. No. 6,226,322, equalization of the analog signal may also be performed to compensate for line attenuation characteristics of transmission channel H. Analog-to-digital conversion process 22 then converts the filtered analog signal into the digital domain, following which conventional digital filtering function 23 is applied to augment the function of the analog filters. The combination of analog and digital filter functions 21, 23 also preferably includes some high-pass filtering to isolate the higher frequency downstream signal from the lower frequency upstream communications, with the necessary rolloff filter characteristic being quite sharp in this FDM case. Functions 21, 22, and 23 are preferably performed by codec device 34 of FIG. 3, to provide a filtered digital data stream to DSP 35 for digital processing, as will now be described.

Referring back to FIG. 2, digital filter function 23 forwards the filtered digital datastream to time domain equalizer (TEQ) 24. TEQ 24 is preferably a finite impulse response (FIR) digital filter, implemented as a software routine executed by DSP 35 (of FIG. 3), that is designed to effectively shorten the length of the impulse response of the transmission channel H, including the filtering that is performed prior to receipt by TEQ 24. The design of this TEQ filter is realized by the selection of the particular coefficients of the FIR implementing TEQ function 24 during initialization, or "training" of modem 20 in combination with modem 10 upon establishing a communications session. The initialization of the coefficients of TEQ 24 according to the preferred embodiment of the invention will be described in detail below.

Following TEQ 24, the cyclic prefix is removed from each received block in function 25. Serial-to-parallel converter 26 then converts the datastream into a number of samples (2N) for application to Discrete Fourier Transform (DFT) function 27. Because the received datastream applied to DFT function 27 is a time-domain superposition of the modulated subchannels, the DFT of this datastream will recover the modulating symbols at each of the subchannel frequencies, reversing the IDFT performed by function 12 in the transmission processing by transmitting modem 10 at the central office. The output of DFT function 27 is a frequency domain representation of the transmitted symbols multiplied by the frequency-domain response of the effective transmission channel, under the assumption that the cyclic prefix is at least as long as the channel response h(t), shortened by TEQ function 24. Frequency-domain equalization (FEQ) function 28 then divides out the frequency-domain response of the effective channel, recovering the modulating symbols. Symbol-to-bit decoder function 29 then resequences the symbols into a serial bitstream, decoding any encoding that was applied in the transmission of the signal, and producing an output bitstream that corresponds to the input bitstream upon which the transmission was based. As shown in FIG. 3, this output bitstream is then forwarded through interface 36 to client workstation W.

According to the preferred embodiment of the invention, TEQ function 24 is designed in a particularly beneficial manner for FDM ADSL applications. As discussed above in the Background of the Invention, conventional mean-squared error (MSE) minimization (or MMSE) approaches to the selection of the TEQ coefficients often were not well-suited for FDM ADSL applications because these minimizations often resulted in near nulls within the frequency bands of interest which, in combination with spectral noise leakage resulting from DFT demodulation, can result in very poor signal-to-noise ratios in some subchannels. In addition, the steep rolloff requirements of the high-pass filtering used to isolate the downstream signal also can cause the TEQ to amplify noise in the stop band region. The present invention addresses these limitations of conventional TEQ design and initialization, as will now be described.

As discussed above, conventional MMSE design of a time domain equalizer (TEQ) involves the minimization of an MSE cost function based on the mean-squared error $E[e^2[n]]$:

$$MSE=E[e^2[n]]=\underline{w}^T R_{yy} \underline{w} + \underline{b}^T R_{xx} \underline{b} - 2\underline{w}^T R_{yx} \underline{w}$$

where vector $\underline{w}$ is an l+1 sample TEQ impulse response, where $R_{xx}$ and $R_{yy}$ are the autocorrelation matrices of vector $\underline{x}_\Delta$ (which is k delayed samples of the input bitstream) and vector $\underline{y}$ (the last l+1 samples of channel output), respectively, and where $R_{yx}$ is their cross-correlation matrix. The sampled channel output vector $\underline{y}$ is before the TEQ $\underline{w}$ is applied. According to the preferred embodiment of the invention, however, near nulls and stop band amplification in the TEQ response are avoided by enforcing a "flatness" constraint:

$$\text{flatness}=(\underline{w}-\underline{\delta}_k)^T(\underline{w}-\underline{\delta}_k)$$

where $\underline{\delta}_k$ is a unit magnitude vector of the same length as TEQ impulse response vector $\underline{w}$ with tap k equal to 1. According to Parseval's theorem, this constraint can be restated in the frequency domain as:

$$\text{flatness} = \int_{-\pi}^{\pi} \|W(e^{j\omega}) - \Delta_k(e^{j\omega})\|^2 d\omega$$

Because the transform $\Delta_k(e^{j\omega})=e^{j\omega k}$ has unit magnitude and arbitrary (linear) phase, the frequency domain expression for the flatness expresses the total deviation of the TEQ response $W(e^{j\omega k})$ from a function having a flat spectral magnitude. If the magnitude of the TEQ response $W(e^{j\omega k})$ is nearly unity, the flatness term will be small; on the other hand, if large magnitude variations are present in the TEQ response $W(e^{j\omega k})$ over an appreciable part of the domain $[-\pi, \pi]$, the flatness term will be significant.

According to the present invention, the design or initialization of TEQ function 24 in modem 20 uses a cost function $J(\underline{w})$ for constrained MMSE by including a flatness term as an additional constraint:

$$J(\underline{w})=MSE+\gamma(\underline{w}-\underline{\delta}_k)^T(\underline{w}-\underline{\delta}_k)$$

where $\underline{\delta}_k=1$ for sample k, and zero elsewhere, and where $\gamma$ is a scaling constant selected to quantify the effect of spectral flatness on the selection of the TEQ filter vector $\underline{w}$. No additional constraint (e.g., UTC or UNC) is necessary for non-zero $\gamma$, because the flatness term non-trivializes the $\underline{w}=0$ solution. The optimal TEQ filter vector $\underline{w}$ becomes:

$$\underline{w}_0 = \arg\min_w J(\underline{w})$$

Recalling the matrix $R_{MSE}=R_{yy-R_{yx}}R_{xx}^{-1}R_{xy}$, and the above expression for cost function $J(\underline{w})$, one may derive an expression for the optimal TEQ filter vector $\underline{w}_0$:

$$\underline{w}_0 = \gamma(R_{MSE}+\gamma I)^{-1}\underline{\delta}_k$$

Proper selection of flatness scaling constant $\gamma$ provides an optimal TEQ filter vector $\underline{w}_0$ for FDM ADSL channels. The effect of flatness scaling constant $\gamma$, and its selection in determining the TEQ filter vector, will be described in further detail below.

Figure 4:
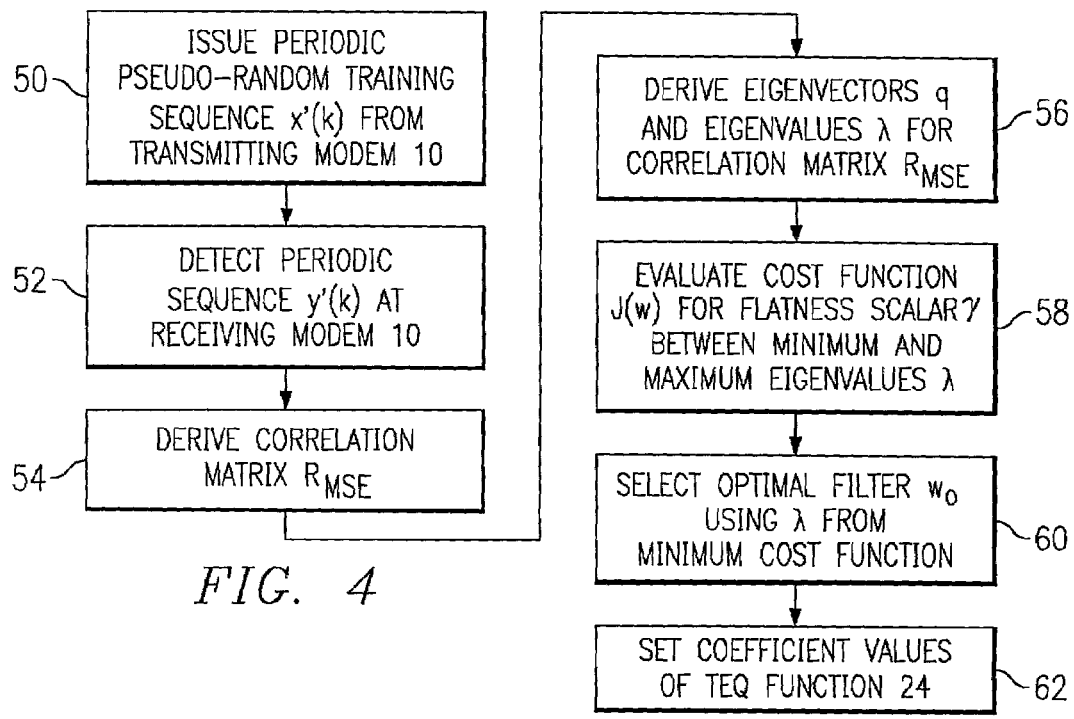
FIG. 4 is a flow diagram illustrating a process of determining coefficients in the time domain equalizer used in the transceiver of FIGS. 3 and 4 according to the preferred embodiment of the invention.

Referring now to FIG. 4, a method of initializing TEQ function 24 in a subscriber modem, such as receiving modem 20 in the system of FIG. 2, according to the preferred embodiment of the invention will now be described. As known in the art, the initializing or training of DSL modems is performed by way of communication between the central office modem and a subscriber modem when a connection is first made. The training process includes such operations as determining bit loading of the DMT subchannels, and the setting of equalizers (including TEQ function 24 and FEQ function 28). U.S. Pat. No. 6,219,378, commonly assigned with this application and incorporated herein by reference, describes an example of the initialization or training of a DSL modem.

According to this preferred embodiment of the invention, the training process begins with process 50, in which a training sequence is generated by transmitting modem 10 in the central office, for receipt by receiving modem 20. In process 50 according to this preferred embodiment of the invention, the training sequence is a periodic pseudo-random sequence x'(k) that is generated by transmitting modem 10 and that can be reproduced at receiving modem 20 for purposes of comparison. The periodic nature of this sequence permits its distortionless transmission without requiring a cyclic prefix, because the periodic signal renders time-domain convolution equivalent to frequency-domain multiplication, permitting the accurate estimates of the communication channel H. Sequence x'(k) is converted to an analog signal, x'(t), prior to transmission.

In process 52, receiving modem 20 detects a received periodic signal y'(t) responsive to the transmitted signal x'(t) based on sequence x'(k). Considering the overall transmission channel impulse response h'(t), periodic signal y'(t) corresponds to the time-domain convolution of signal x'(t) with the effective channel response h'(t). Because receiving modem 20 can reproduce the sequence x'(k), receiving modem 20 can derive an estimate of the channel response h'(t) from a comparison of the received signal y'(t) and a corresponding recovered sequence y'(k) with the pseudo-random sequence x'(k), which is of course the expected sequence.

According to this preferred embodiment of the invention, DSP 35 in receiving modem 20 derives, in process 54, autocorrelation matrices $R_{xx}$ and $R_{yy}$, based on the (known) locally generated pseudo-random training vector $\underline{x}_\Delta$ and the received signal vector $\underline{y}$, respectively, and their cross-correlation matrix $R_{yx}$. Based on these correlation matrices, receiving modem 20 also derives MSE matrix $R_{MSE}=R_{yy}-R_{yx}R_{xx}^{-1}R_{xy}$, for the pseudo-random sequence x'(k) as generated, and sequence y'(k), as the result of process 54.

As noted above, one may consider the optimal TEQ filter vector $\underline{w}_0$ as:

$$\underline{w}_0 = \gamma(R_{MSE}+\gamma I)^{-1}\underline{\delta}_k$$

At this point, however, the flatness scaling constant $\gamma$ is not yet determined; indeed, the value of flatness scaling constant $\gamma$ determines the optimal projection of the eigenvectors of $R_{MSE}$ for the optimal TEQ filter vector $\underline{w}_0$ and is therefore not determined a priori according to the preferred embodiment of the invention. The correlation matrix $R_{MSE}$ is Hermitian, however, and therefore can be written in the form of its eigenvectors $Q=\{\underline{q}_1, \underline{q}_2, \ldots, \underline{q}_N\}$, and its eigenvalue matrix $\Lambda = \text{diag}\{\lambda_1, \lambda_2, \ldots, \lambda_N\}$:

$$R_{MSE}=Q\Lambda Q^*$$

Further, the ith eigenvalue $\lambda_i$ returns the MSE solution when its eigenvector $q_i$ is the TEQ filter. Accordingly, one may derive an equivalent solution for optimal TEQ filter vector $\underline{w}_0$ from:

$$\omega_0 = Q\left(\frac{\Lambda}{\gamma}+I\right)^{-1}(Q*\underline{\delta}_k)$$

In effect, optimal TEQ filter vector $\underline{w}_0$ is a linear combination of the eigenvectors $q_i$ with weights $c_i$ as follows:

$$c_i = \frac{q_i^*\underline{\delta}_k}{1+\frac{\lambda_i}{\gamma}}$$

These coefficients $c_i$ have been observed, in connection with this invention, to exhibit a saturation behavior as a function of flatness scaling constant $\gamma$. With a small $\gamma \ll \lambda_i$, the denominator of the weights $c_i$ become large, driving the coefficient $c_i$ itself to zero; conversely, as flatness scaling constant $\gamma$ approaches and exceeds eigenvalue $\lambda_i$, the coefficient increases rapidly and saturates at $c_i = q_i^*\underline{u}_k$. As a result, as noted above, the value of flatness scaling constant $\gamma$ can have an effect on the selection of the eigenvectors that project onto optimal TEQ filter vector $\underline{w}_0$.

In order to arrive at this eventual solution, therefore, referring back to FIG. 4, DSP 35 derives the set Q of eigenvectors q and the set $\Lambda$ of eigenvalues $\lambda$ of the correlation matrix $R_{MSE}$, in process 56. It is contemplated that conventional numerical techniques for deriving the eigenvalues and eigenvectors for correlation matrix $R_{MSE}$ may be readily applied by those skilled in the art having reference to this specification. Specifically, it is contemplated that conventional Cholesky decomposition techniques and the like are suitable for use in this regard.

Once the eigenvectors q and eigenvalues $\lambda$ of correlation matrix $R_{MSE}$ are determined, DSP 35 next evaluates the cost function J(w):

$$J(\underline{w})=MSE+\gamma(\underline{w}-\underline{\delta}_k)^T(\underline{w}-\underline{\delta}_k)$$

which includes the flatness constraint, over a series of values of the flatness scaling constant $\gamma$, in process 58. Considering the saturation behavior of the linear coefficients $c_i$ noted above, the trial values of flatness scaling constant $\gamma$ are between the minimum-valued eigenvalue $\lambda_{min}$ and the maximum-valued eigenvalue $\lambda_{max}$, as it has been observed that the TEQ filters resulting from such flatness scaling constant values provide good MSE performance in the time domain, while avoiding near null points in the frequency domain. In addition, because the matrix $$\left(\frac{\Lambda}{\gamma}+I\right)$$

is diagonal, its inversion and thus the cost function evaluation for multiple values of flatness scaling constant $\gamma$ is computationally simple, and can readily and quickly be performed by DSP 35.

In process 60, the value of flatness scaling constant $\gamma$ providing the minimum value of the cost function J(w) is determined, and is applied to the solution equation:

$$\underline{\omega}_0 = Q\left(\frac{\Lambda}{\gamma}+I\right)^{-1}(Q*\underline{\delta}_k)$$

to solve for the optimal TEQ filter vector $\underline{w}_0$, in process 60. In process 62, this filter vector $\underline{w}_0$ is then applied as coefficients to the digital FIR filter applied by DSP 35 as TEQ function 24. As noted above, this optimization of the TEQ filter provides excellent MSE performance, and thus good performance in the shortening of the channel response, while avoiding near nulls in the frequency passband of interest and avoiding noise amplification in the stop band region.

Alternatively to the method of FIG. 4, one may perform an MMSE minimization for a value selected flatness scaling constant $\gamma$, if desired. Because the flatness scaling constant $\gamma$ is preferably within the range of the eigenvalues of the correlation matrix, however, it is contemplated that the method described above relative to FIG. 4 is preferable.

Figure 5:
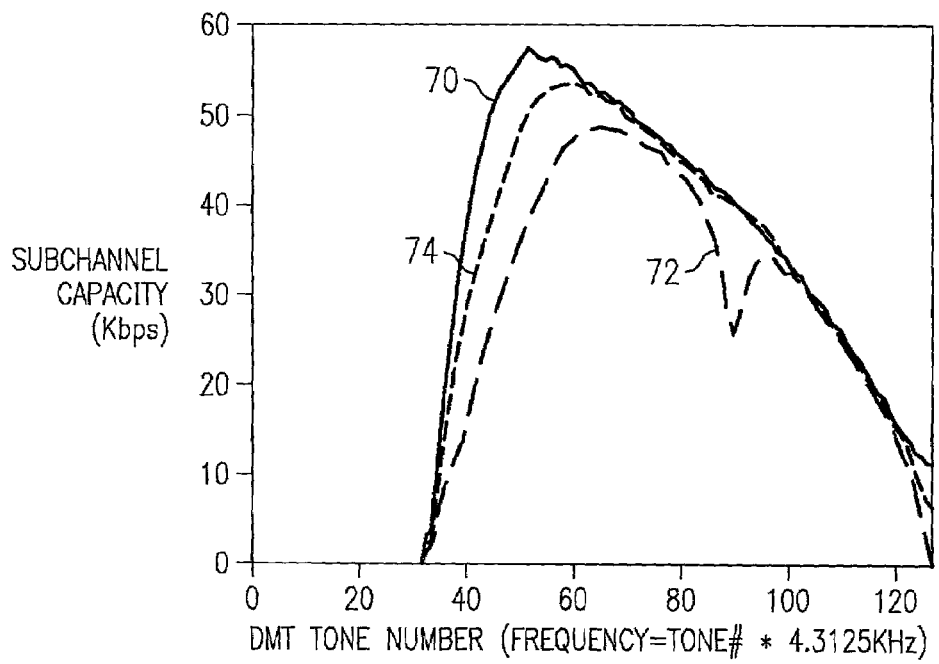
FIG. 5 is a simulation plot of downstream subchannel capacity in the communication system of FIG. 2 according to the preferred embodiment of the invention, in comparison with conventional time domain equalizer algorithms.

The preferred embodiment of the present invention has been simulated over a wide range of test loops in an ADSL system, specifically over the test loops specified by the ANSI standard, which include varying lengths of different gauge twisted-pair wire. FIG. 5 illustrates the results of this simulation, in which plot 70 illustrates the channel capacity according to the preferred embodiment of the invention. By way of comparison, plot 72 shows the channel capacity using a conventional MMSE minimization in TEQ design, and plot 74 shows the channel capacity for a TEQ designed according to the technique of ad hoc approximation to the capacity maximization problem, described in the Farhang-Boroujeny et al. reference cited above. The channel capacity provided by the present invention is thus an improvement over that provided by conventional TEQ designs.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of training a time domain equalizer in a receiving modem, comprising the steps of:
    receiving a training signal;
    regenerating the training signal in the receiving modem;
    operating a digital circuit in the receiving modem to derive coefficients for a time-domain equalizer digital filter from the received and regenerated training signals, by performing a minimization process constrained by a spectral flatness term in the frequency domain of the equalizer characteristic; and
    storing a filter vector based on the derived coefficients, for use in a time-domain equalizer digital filter, wherein the operating step comprises:
        deriving correlation matrices from the received and regenerated training signals;
        deriving eigenvectors and eigenvalues for a combination of the correlation matrices;
        evaluating a cost function including a mean squared error term and a weighted spectral flatness term, the evaluating being performed using the derived eigenvectors and eigenvalues, over multiple trial values of a weighting constant;
        selecting a value of the weighting constant that provides a minimum value of the cost function; and
        then deriving an optimal filter vector using the selected weighting constant value.

2. The method of claim 1, if wherein the multiple trial values of the weighting constant have values between a minimum eigenvalue and a maximum eigenvalue.

3. A method of recovering a signal from a transmitted analog signal, comprising the steps of:
    receiving, over a transmission channel, an analog signal corresponding to modulated digital symbols in a plurality of frequency subchannels;
    analog-to-digital converting the analog signal into a discrete datastream;
    applying a time-domain equalizer to the datastream, the time-domain equalizer corresponding to a digital filter having coefficients derived according to a mean-squared error minimization that is constrained according to a spectral flatness;
    applying a discrete Fourier transform to the equalized datastream to recover symbols from each of the plurality of subchannels;
    applying a frequency domain equalizer to remove a channel response of the transmission channel; and
    after the step of applying a time-domain equalizer and before the step of applying a discrete Fourier transform, removing a cyclic prefix from each of a plurality of blocks of symbols in the datastream.

4. The method of claim 3, further comprising:
    prior to the receiving step, training the time domain equalizer by performing a plurality of operations comprising:
        receiving a training signal over the transmission channel;
        locally regenerating a replica training signal;
        operating a digital circuit to derive coefficients for a time domain equalizer digital filter from the received and regenerated training signals, by performing a minimization process constrained by a spectral flatness in the frequency domain of the equalizer characteristic; and
        storing a filter vector based on the derived coefficients, for use in the time-domain equalizer digital filter.

5. The method of claim 4, wherein the operating operation comprises:
deriving correlation matrices from the received and regenerated signals;
deriving eigenvectors and eigenvalues for a combination of the correlation matrices;
evaluating a cost function including a mean squared error term and a weighted spectral flatness term, the evaluating being performed using the derived eigenvectors and eigenvalues, over multiple trial values of a weighting constant;
selecting a value of the weighting constant that provides a minimum value of the cost function; and
then deriving an optimal filter vector using the selected weighting constant value.

6. A transceiver for discrete multitone communications, comprising:
means for receiving a training signal;
means for regenerating the training signal in the receiving modem;
means for operating a digital circuit in the receiving modem to derive coefficients for a time-domain equalizer digital filter from the received and regenerated training signals, by performing a minimization process constrained by a spectral flatness term in the frequency domain of the equalizer characteristic; and
means for storing a filter vector based on the derived coefficients, for use in a time-domain equalizer digital filter, wherein means for operating digital circuit comprises:
means for deriving correlation matrices from the received and regenerated training signals;
means for deriving eigenvectors and eigenvalues for a combination of the correlation matrices;
means for evaluating a cost function including a mean squared error term and a weighted spectral flatness term, the evaluating being performed using the derived eigenvectors and eigenvalues, over multiple trial values of a weighting constant;
means for selecting a value of the weighting constant that provides a minimum value of the cost function; and
means for deriving an optimal filter vector using the selected weighting constant value.

7. A transceiver according to claim 6, wherein the multiple trial values of the weighting constant have values between a minimum eigenvalue and a maximum eigenvalue.

8. A transceiver comprising:
means for receiving, over a transmission channel, an analog signal corresponding to modulated digital symbols in a plurality of frequency subchannels;
means for analog-to-digital converting the analog signal into a discrete datastream;
means for applying a time-domain equalizer to the datastream, the time-domain equalizer corresponding to a digital filter having coefficients derived according to a mean-squared error minimization that is constrained according to a spectral flatness;
means for applying a discrete Fourier transform to the equalized datastream to recover symbols from each of the plurality of subchannels;
means for applying a frequency domain equalizer to remove a channel response of the transmission channel; and
means for removing a cyclic prefix from each of a plurality of blocks of symbols in the datastream, wherein the cyclic prefix is removed after applying a time-domain equalizer and before applying a discrete Fourier transform.

9. A transceiver according to claim 8, further comprising:
means for training the time domain equalizer by performing a plurality of operations, wherein the means for training the time domain equalizer comprising: means for receiving a training signal over the transmission channel;
means for locally regenerating a replica training signal;
means for operating a digital circuit to derive coefficients for a time domain equalizer digital filter from the received and regenerated training signals, by perforating a minimization process constrained by a spectral flatness in the frequency domain of the equalizer characteristic; and
means for storing a filter vector based on the delved coefficients, for use in the time-domain equalizer digital filter.

10. A transceiver according to claim 9, further comprising:
means for deriving correlation matrices from the received and regenerated signals;
means for deriving eigenvectors and eigenvalues for a combination of the correlation matrices;
means for evaluating a cost function including a mean squared error term and a weighted spectral flatness term, the evaluating being performed using the derived eigenvectors and eigenvalues, over multiple trial values of a weighting constant;
means for selecting a value of the weighting constant that provides a minimum value of the cost function; and
means for deriving an optimal filter vector using the selected weighting constant value.

* * * * *